US008468494B2

(12) United States Patent
Rude

(10) Patent No.: US 8,468,494 B2
(45) Date of Patent: Jun. 18, 2013

(54) IN-LINE EDITOR

(75) Inventor: Eirik Rude, Jacksonville, FL (US)

(73) Assignee: Oracle Taleo LLC, Redwood Shores, CA (US)

( * ) Notice: Subject to any disclaimer, the term of this patent is extended or adjusted under 35 U.S.C. 154(b) by 1191 days.

(21) Appl. No.: 12/018,171

(22) Filed: Jan. 22, 2008

(65) Prior Publication Data

US 2008/0189682 A1  Aug. 7, 2008

Related U.S. Application Data

(60) Provisional application No. 60/941,141, filed on May 31, 2007, provisional application No. 60/881,723, filed on Jan. 22, 2007.

(51) Int. Cl.
*G06F 9/44* (2006.01)
*G06F 3/00* (2006.01)
*G06F 3/048* (2006.01)

(52) U.S. Cl.
USPC ........... 717/113; 717/105; 717/109; 717/110; 717/125; 715/751; 715/763

(58) Field of Classification Search
USPC ........................................................ 717/113
See application file for complete search history.

(56) References Cited

U.S. PATENT DOCUMENTS

| | | | |
|---|---|---|---|
| 6,275,790 B1 | 8/2001 | Yamamoto et al. | |
| 6,311,151 B1 * | 10/2001 | Yamamoto et al. | 704/8 |
| 6,321,261 B1 | 11/2001 | Glass | |
| 6,735,759 B1 | 5/2004 | Yamamoto et al. | |
| 6,782,529 B2 * | 8/2004 | Kumhyr | 717/111 |
| 6,839,712 B1 | 1/2005 | Kumhyr et al. | |
| 6,904,563 B2 | 6/2005 | Kumhyr et al. | |
| 6,920,630 B2 * | 7/2005 | Jackson | 717/168 |
| 7,069,509 B2 * | 6/2006 | Griffin | 715/712 |
| 7,069,553 B2 | 6/2006 | Narayanaswamy et al. | |
| 7,152,222 B2 | 12/2006 | Kumhyr et al. | |
| 7,536,640 B2 * | 5/2009 | Zhang et al. | 715/234 |

(Continued)

OTHER PUBLICATIONS

Deitsch et al. "Isolating Locale-Specific Data with Resource Bundles" Mar. 2001, Chapter 4, of Java International—O'Reilly Media, retrieved from <http://oreilly.com/catalog/javaint/chapter/ch04.pdf>, relevant pp. 63-91.*

(Continued)

*Primary Examiner* — Don Wong
*Assistant Examiner* — Marina Lee
(74) *Attorney, Agent, or Firm* — Kilpatrick Townsend & Stockton LLP

(57) ABSTRACT

A software application, method of constructing same, and method for editing text displayed by same are disclosed. In a form, the software application is a web-format application with a core set of executable instructions dictating the display, operation, and user interaction, the instructions including identifiers for text to be displayed on pages thereof. The software application includes at least one secondary file containing text strings and keys therein, and the identifiers use the keys to locate the text strings to be displayed. An editor is provided that allows for direct editing of the displayed text items, and the edited text items are then saved back to the secondary file(s). The software application further includes a program, such as an AJAX program or module, for automatically and dynamically changing the displayed text item to the edited text item on the displayed web page, for every user of the application.

24 Claims, 3 Drawing Sheets

U.S. PATENT DOCUMENTS

| | | | |
|---|---|---|---|
| 7,788,648 B2 * | 8/2010 | Bossom et al. | 717/136 |
| 7,861,213 B2 * | 12/2010 | Wang | 717/100 |
| 7,962,644 B1 * | 6/2011 | Ezerzer et al. | 709/238 |
| 2001/0037490 A1 | 11/2001 | Chiang | |
| 2003/0079051 A1 | 4/2003 | Moses et al. | |
| 2003/0110469 A1 * | 6/2003 | Jackson | 717/113 |
| 2003/0137530 A1 * | 7/2003 | Griffin | 345/705 |
| 2006/0004725 A1 * | 1/2006 | Abraido-Fandino | 707/3 |
| 2006/0026563 A1 | 2/2006 | Cabillic | |
| 2006/0174196 A1 | 8/2006 | Zhang et al. | |
| 2006/0235928 A1 | 10/2006 | Cacenco et al. | |
| 2006/0236306 A1 | 10/2006 | DeBruin et al. | |
| 2006/0294500 A1 | 12/2006 | Chiang | |
| 2007/0011298 A1 | 1/2007 | Givoly et al. | |
| 2007/0113194 A1 * | 5/2007 | Bales et al. | 715/769 |
| 2008/0189682 A1 * | 8/2008 | Rude | 717/111 |
| 2009/0030674 A1 * | 1/2009 | Chakra et al. | 704/8 |

OTHER PUBLICATIONS

"XLIFF 1.2 Representation Guide for Java Resource Bundles", Committee Draft, May 16, 2006, retrieved from <https://www.oasis-open.org/committees/download.php/19111/cd-xliff-profile-java-1.2-20060516.pdf> total pages 10.*

* cited by examiner

US 8,468,494 B2

IN-LINE EDITOR

CROSS-REFERENCE TO RELATED APPLICATION(S)

This application claims the benefit of U.S. Provisional Patent Application No. 60/941,141, filed May 31, 2007, and U.S. Provisional Patent Application No. 60/881,723, filed Jan. 22, 2007, the entirety of each being incorporated by reference herein.

FIELD OF THE INVENTION

The invention relates to software applications and methods of textual editing of software applications and, in particular, to an in-line editor function or application for dynamic editing of text web-based applications.

BACKGROUND

Currently, the traditional process flow for software application creation begins with coding in a software language. The coding involves laying out all executable commands, modules, sub-programs, etc., creating all the formatting for graphical display, and providing that which is to be displayed on the graphical user interface (GUI) as the software is running, including text and objects, for instance.

The coding is compiled, and then tested. A programmer or software engineer runs through all aspects of the program to ensure that the program operates as intended, as well as ensures that all displayed materials are shown as expected, including typographical errors, proper formatting, and consistency. For instance, while the software application itself (and compiler, etc.) would recognize improper coding of executable commands and return an error statement when running or compiling, the only manner in which a typographical error is detected is by displaying the text on the GUI and a software engineer recognizing the error.

Additionally, as a single application may be constructed partly or entirely with re-usable modules built at different times by many different people, there may be inconsistencies in textual usage. Specifically, a particular module may have been built using a text string "Start," while a second module used in the same application may use a text string "Begin." Typically, a software provider would like each of these to be the same. It is during testing and running that these may be noticed.

During testing, the software engineer may have a hardcopy of the code on hand, and make hand edits on the hardcopy. The source code is then accessed and each of the revisions is addressed by altering or correcting the code and, in particular, the text strings. The program is then re-compiled and run again. As can be seen, this is a long and tedious process.

Once the program is completed, it may be packaged and/or released. However, as is clear, the text strings are not assessed by anything other than a user/engineer for being proper. Specifically, the application itself (or host machine) does not assess whether the person viewing the text is actually viewing information that conveys the intended message. More specifically, a computer does not recognize that a program built with text strings in a particular human language, such as English, are properly understood by a user who speaks Chinese or Russian, for instance.

Therefore, a process known as internationalization must be performed for the text strings. There are a number of traditional internationalization methods, including examining the source code line-by-line for translation, or a user may run the program and make notes regarding the necessary translation.

In an improved method of internationalization, all the textual content of the source code may be identified and collected to allow a program, as a first translation step, to extract and translate the text strings. A problem with this method is that much of the source code is also written with characters that are identified as text and should not translated. Often, this leads to inadvertent translation of source code commands, and compiling the application will then fail or return an error on running.

A number of improved methods for editing software have been devised to simplify the process of textual edits. For instance, U.S. Pat. No. 6,735,759, to Yamamoto, et al., describes an editing system for translating text. The '759 patent notes the problem of translations made when the text is extracted from the application and, thus, not displayed in context. The result is that, when a plurality of words may be selected, an improper selection may be made that is not recognized until the text is displayed during running of the application. While a number of forms are described, the '759 patent generally teaches an introspective editor built into the software application itself and running at the same time. In response to engineer interaction, the editor provides a pop-up window containing text to be edited. The text may be altered or re-written to provide a new text string that is then stored in a localization file for future use.

However, the '759 patent has a number of deficiencies. First of all, all the edits are stored "for future use." In other words, software application does not recognize the change until the application is re-started and, thus, the changes are not viewable until such happens. Therefore, any other users (such as distributed users accessing the software on a host network machine from user terminals) will not see any of the changes until the program is restarted from the host machine. Furthermore, the editor function relies on introspection which itself relies on very specific naming conventions in a resource bundle to properly identify the text string to be edited. This results in greater demands placed on software engineers/programmers at the initial build stage, and existing modules that otherwise could be used must be re-coded to conform to the conventions necessary for introspection. Lastly, the '759 patent provides a separate resource key, for instance, for every text string that may displayed by the application, the result being that every instance of text that is to be translated, for instance, must be individually changed.

Accordingly, there has been a need for an improved software editor for editing text to be displayed on a graphical user interface.

SUMMARY

In accordance with an aspect, software application is disclosed including a first set of executable instructions for displaying of at least one text item on a graphical user interface, the instructions including an identifier for the at least one text item, at least one secondary file including a key corresponding to the identifier, and including a text string corresponding to the at least one text item, an editor for editing the text string, the editor allowing for the text item to be edited by a user, and the editor directing the edited text to be saved to the secondary file, wherein the edited text is dynamically displayed on the graphical user interface without reloading by the user.

In some forms of the software application, the text item is displayed in multiple locations, and editing of the text item causes the edited text to be dynamically displayed on each location. The text item may be displayable on multiple web-format pages.

In some forms of the software application, the instructions are programmed in web-application format, and the instructions provide for the display of at least one web-format page. The instructions may provide for the display of multiple text items, wherein a single identifier is provided for identical text items, and the instructions display the identical text string from the at least one secondary file regardless of location of the page location for the text item.

In some forms of the software application, the editor is activated by identification of a privileged user. The software application may permit multiple privileged users may edit text simultaneously.

In some forms, the software application includes an AJAX program, wherein the AJAX program recognizes the edited text and directs the edited text to be dynamically displayed.

In another aspect, a software application is disclosed including a set of executable instructions for displaying pages in web-format, the pages having multiple text items displayed thereon, the instructions including identifiers corresponding to the text items, a plurality of secondary files containing keys and text strings, the keys corresponding to the identifiers, and an editor for editing the text displayed on the web pages, the editor allowing a privileged user to edit the text item to create an edited text item, and the editor directing the edited text item to be saved to the corresponding secondary file, wherein the edited text item is dynamically displayed on the graphical user interface without reloading by the user.

In some forms of the software application, at least one text item is displayed in multiple locations on the web pages, and the edited text item is displayed in each of the multiple locations.

In some forms of the software application, the secondary files are resource bundles. The resource bundles may be are written in .xml format, and, upon loading of the software application, the resource bundles are converted to Java objects.

In another aspect, a method is disclose for editing textual displays of a web-based software application having multiple web pages and multiple text items, the software application including a set of executable instructions for displaying web pages on a graphical user interface and allowing interaction therewith by a user, software application including at least one secondary file providing resource bundles having a key and text strings corresponding to the text items, the executable instructions having an identifier for locating the key and for calling the text string for display on the web page, the method including the steps of providing code for each text item which may be edited, selecting a text item to be edited by interacting with a web page on which the text item is displayed, editing the text item on the web page to create an edited text item, saving the edited text item to the secondary files, and dynamically displaying the edited text item in place of the text item on the web page without reloading.

In some forms, the method includes the step of overwriting the text string in the resource bundle with the edited text item.

In some forms, the method includes the step of providing user privileges to a user to permit the user to edit the text items.

In some forms, the method includes the steps of providing multiple locations on the web pages for a single text item, providing a single identifier for the single text item in multiple locations, and dynamically displaying edited text item in each of the multiple locations displayed.

In some forms, the method includes the steps of hosting the software application on a host machine, allowing simultaneous access to a plurality of users on a plurality of user terminals, and dynamically changing the displayed text item to the edited text item on each of the user terminals displaying the page having the text item thereon. The method may include the step of providing at least two of the users with simultaneous editing privileges.

In some forms, the step of saving the edited text item includes creating a new secondary file. The new secondary file may include at least one key, and the method may include the step of creating the new secondary file for a translated version of the software application.

BRIEF DESCRIPTION OF THE DRAWINGS

In the Figures.

DETAILED DESCRIPTION

Figure 1:
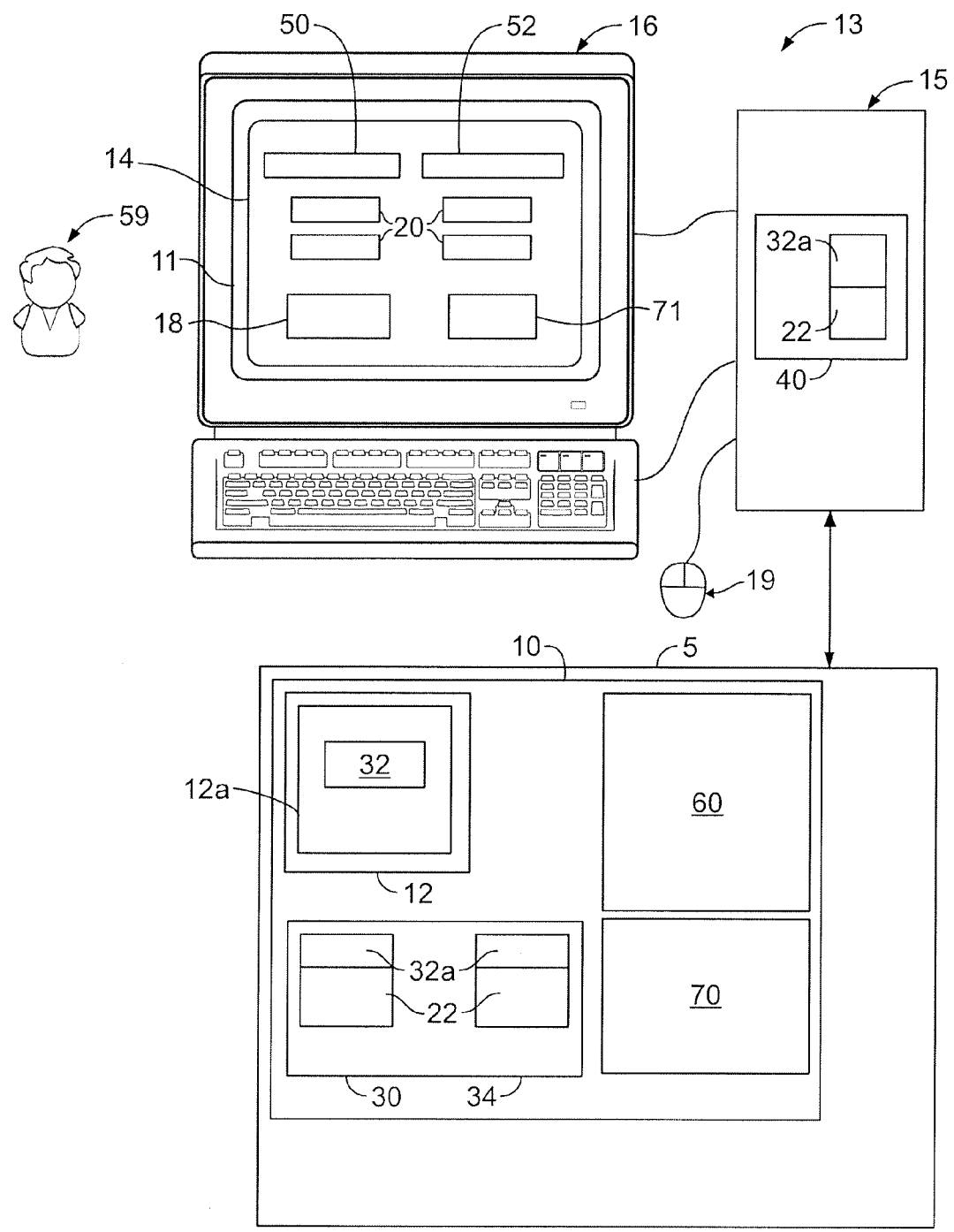
FIG. 1 is a graphical representation of a software application and a process for running the software application.

Referring initially to FIG. 1, a software application 10 is shown stored on a host machine 5 such as a server. Preferably, the software application 10 is a web application (Internet, Intranet, etc.), preferably run from within a web browser window 11, though not necessarily via the World Wide Web. The application 10 includes a set of executable instructions 12 written as source code so that the application 10 displays web pages 14 on the browser window 11 in the desired manner and with the desired function to a user on a graphical user interface (GUI) 16 at a user terminal 13. During operation of the application 10, the GUI 16 may display, for instance, graphical objects 18 and text 20, wherein the text 20 is stored in the application 10 as text strings 22.

The instructions 12 include code 12a that directs retrieval of text strings 22, for instance, to be displayed on the GUI 16. When a particular web page 14, or text 20 in any manner, is to be displayed, the instructions 12 are coded to recognize that the text 20 is not stored in the instructions 12 themselves. Code 12a utilizes an identifier 32 and directs a processor 15 to retrieve the text 20 by searching for an external or secondary file 30 corresponding to the identifier 32, the secondary file 30 also containing at least one text string 22 corresponding to the text 20.

In a preferred form, the secondary files 30 are written in .xml format as resource bundles 34. While considered part of the application 10, the secondary files 30 are separate from the instructions 12. At initialization (load or run) of the application 10, the resource bundles 34 are read into the processor 15 and converted into java objects 40, principally to provide the performance expected of a web-type program. Each of the resource bundles 34 and, hence, the java objects 40 containing text strings 22 includes a key 32a corresponding to the identifier 32. Therefore, during execution of the instructions 12 and when text 20 is to be displayed, the code 12a identifies the key 32a, and the processor 15 locates the appropriate java object 40 by locating the key 32a therein and calling the text string 22 thereof. Once this has occurred, the instructions 12 cause the text string 22 of the java object 40 to be displayed on the GUI 16 as a text item 20.

As discussed above in the background, prior art applications in which text is stored in external files, as described for the present invention, every text string to be displayed on the GUI 16 is provided with a separate key or is otherwise separately identified. Therefore, each text string of the prior art must be separately translated, if such is the operation.

In forms of the present invention, a single key 32a may be used to identify a text string 22 that is to be displayed a plurality of times as text 20 on a single page 14, on a plurality of pages 14, or both. For instance, the application 10 may be tailored for a particular customer or client. During operation, the application 10 may display (to the user, on the GUI 16) a customer name 50 or advertising slogan 52, as shown in FIG. 1. In forms of the present invention, a plurality of instances of the same text 20 to be displayed, such as name 50 or slogan 52, may utilize the same key 32a identification, and the same resource bundle/java object 40 may be used repeatedly, whether the text 20 is to be displayed multiple times on a single page 14 or across multiple pages 14. Thus, a single editing operation (described below) edits a single text string 22 in the java object 40, the text string 22 being repeatedly used for display of the text 20 in the application 10. This allows for reduced editing and translation time and labor.

Additionally, this simplifies harmonization. As noted, in previous methods of build/edit a debugger or engineer would need to recognize the use of "Start" on one page and "Begin" on another page. Utilizing the present methods, each use of "Start" and "Begin" in the instructions 12 would simply identify the key 32a, and the same java object 40 containing the key 32a supplies the appropriate text string 22/text 20 for display.

Figure 2:
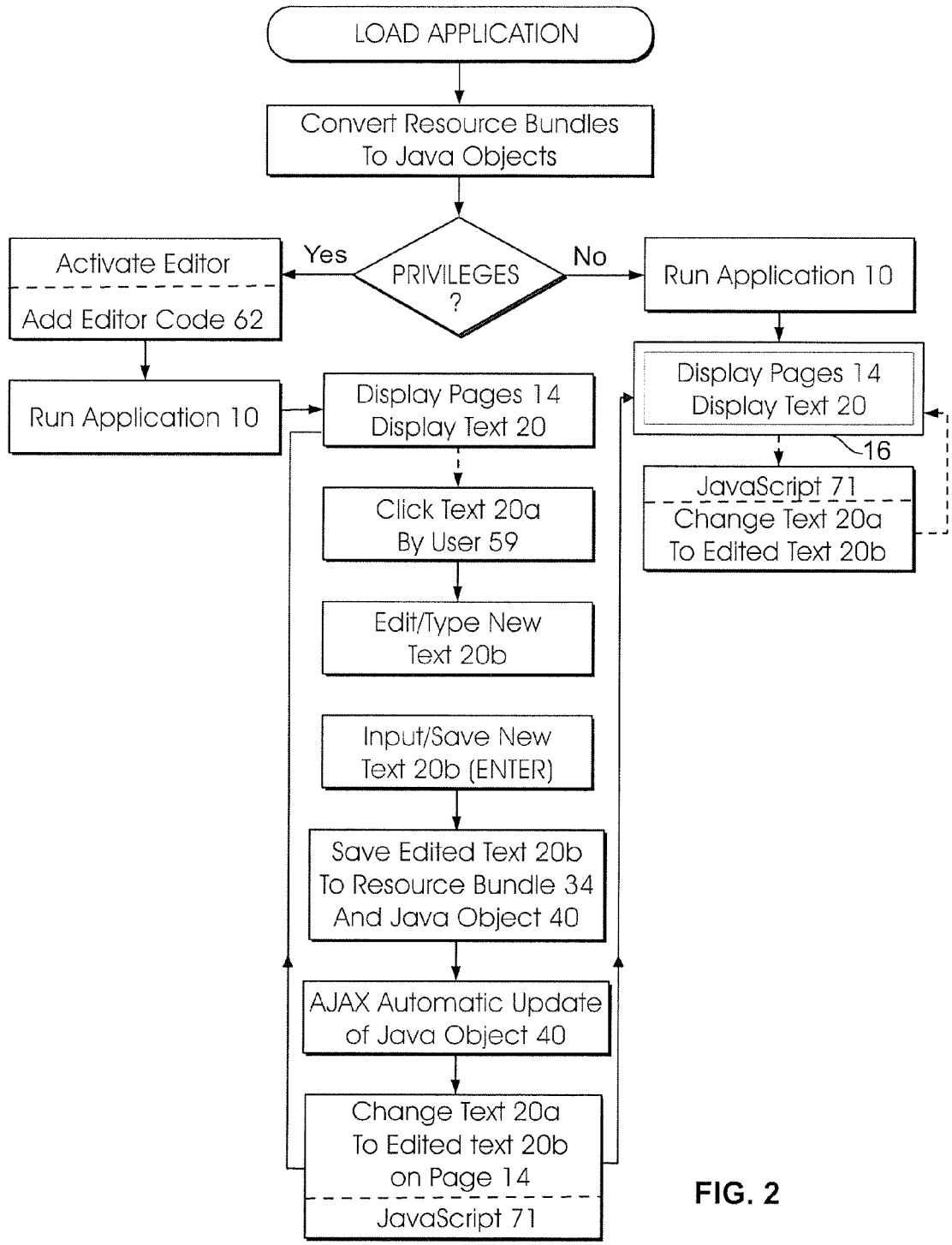
FIG. 2 is a graphical representation of a process for editing textual displays of the software application of FIG. 1.

Turning now to FIG. 2, an exemplary process for editing the text for display in the application 10 is presented. Specifically, the application 10 includes an editor 60 program (FIG. 1). When a user 59 (FIG. 1) with editing privileges accesses the application 10, the editor 60 is activated. In the present form, activation of the editor 60 causes a block of editor code 62 to be added around each displayed text 20. The editor code 62 allows the privileged user 59 to select text 20a (FIG. 1) to be edited by, for instance, a mouse 19 right-click. The user 59 is then able to edit the text 20a directly on the page 14, resulting in text 20b. With a further appropriate indication (such as striking ENTER on the keyboard or clicking anywhere on the page 14), the user 59 indicates to the application 10 that the text 20b is to be saved to the resource bundle 34/java object 40.

The edited text 20b becomes immediately available to not only the privileged user 59, but to all users 61 utilizing user terminals 74 across a distributed network. The application 10 includes an AJAX 70 (Asynchronous JavaScript and XML) program so that, upon recognizing that the text 20a has become 20b, the AJAX 70 dynamically and near-instantaneously reaches out to all sessions running the application 10 to change, replace, or substitute the text from the original text 20a to the edited text 20b on each distributed user's GUI 16. Additionally, this allows multiple privileged users 59 to edit simultaneously. In one form, the AJAX 70 reaches out to the Java objects 40, and updates each, while a JavaScript 71 embedded in the displayed page 14 itself. In this manner, the edited text 20b is automatically displayed without reloading (including refreshing or requesting or any separate other affirmative action) by any user 59, 61.

Figure 3:
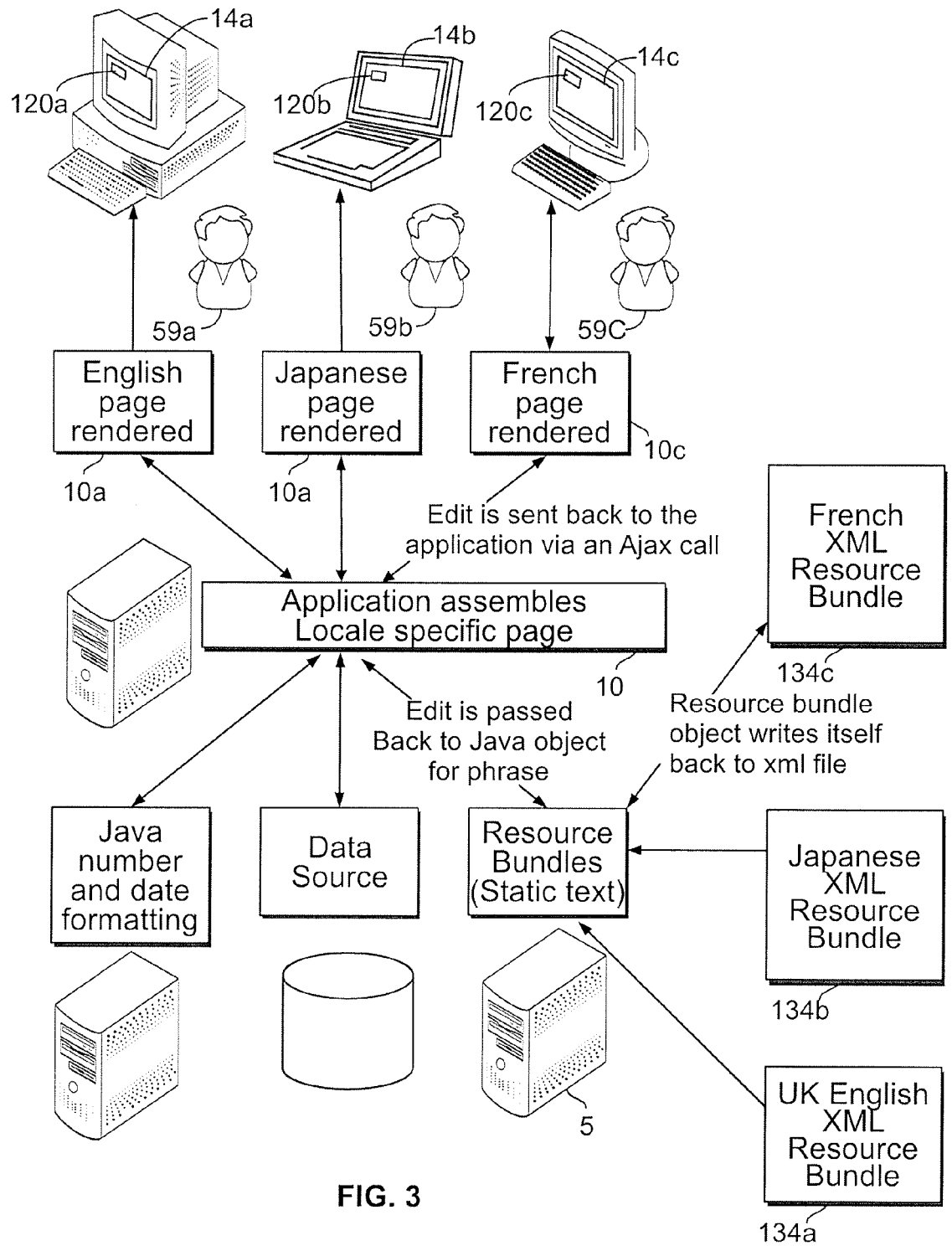
FIG. 3 is a graphical representation of internationalization of the software application of FIG. 1 in accordance with processes and methods of the present invention.

In a form of the present invention, internationalization is more robust and simplified, as shown in FIG. 3. Representatively, the application 10 is able to assemble multiple locale or language specific applications 10a, 10b, and 10c, as shown, respectively corresponding to United Kingdom English ("UK"), Japanese ("JP"), and French ("FR"), as examples only. The applications 10a-10c are shown with respective corresponding and representative pages 14a-14c, each of which allows a privileged user 59a-59c to edit text 120a displayed thereon to become text 120b. In one form, the edited text 120b is sent back to the application 10, which in turn sends the text 120b to a copy of the resource bundle 34 within the particular language specific application 10a-10c so that, like in the form discussed above, the text string 22 in the resource bundle 34/Java object 40 may be overwritten due to the editing thereof. In another form, a new resource bundle 134 may be created, such as resource bundles 134a-134c corresponding to the UK, JP, and FR languages, and these are collectively stored within application 10 or on the host machine 5. Again, the AJAX 70 program and JavaScript 71 operate to dynamically and near-instantaneously update displayed pages with the edited text 120b, such as page 14a for each user of application 10a utilizing user terminals 74 across a distributed network, and to update the Java object 40.

The importance of creating new resource bundles 134 (or, alternatively adding a new key 132a and text string 122 to the resource bundle 34) is that translations may be retained and leveraged for future use. As examples, an application 10 may be customized for a variety of customers. Existing or previous translations may be used, while still affording the opportunity to customize certain aspects, such as placing a customers name 50 or slogan 52 on one or more pages.

As described, it can be seen that the methods and applications discussed herein provide a number of benefits. Text 20 may be edited directly on the GUI 16 and be dynamically and immediately viewed by a privileged user 59 and by all users 61. The text 20 may be edited in context, and the text 20 may be edited without opening the source code, thereby reducing errors in identifying text 20 for editing and in unintentionally altering the source code. Internationalization of the application 10 is simple and straightforward as the text 20 is displayed in context on the page 14, and edits thereto are immediately stored and made available, and previous or existing translations can be leveraged in future use.

Furthermore, the simplicity of the system allows any privileged user 59, without particular software engineering knowledge to edit the application. For example, marketing personnel can easily tailor the application 10 to use for a particular client pitch.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of editing textual displays of a web-based software application having multiple web pages and multiple text items, the method comprising:
   executing the web-based software application, the software application including a set of executable instructions for displaying web pages on a graphical user interface and allowing interaction therewith by a user, the software application including at least one secondary file providing resource bundles having a single key and text strings corresponding to text items, the executable instructions having an identifier for locating the single key and for calling the text strings for display on the web page;
   reading code for each text item which may be edited;

receiving a selection of a text item to be edited by through a web page on which the text item is displayed;

creating an edited text item based on edits to the text item on the web page;

saving the edited text item to the secondary file, wherein the single key of the secondary file identifies text items that are displayed a plurality of times on the web page; and dynamically displaying the edited text item in place of the text item on the web page using the single key for a plurality of users across a distributed network without reloading or refreshing the web page by the users.

2. The method of claim 1 further comprising overwriting the text strings in the resource bundle with the edited text item.

3. The method of claim 1 further comprising providing user privileges to a user to permit the user to edit the text items.

4. The method of claim 1 further comprising:
providing multiple locations on the web pages for a single text item;
providing a single identifier for the single text item in multiple locations; and
dynamically displaying edited text item in each of the multiple locations displayed.

5. The method of claim 1 further including the step comprising:
hosting the software application on a host machine;
allowing simultaneous access to a plurality of users on a plurality of user terminals; and
dynamically changing the displayed text item to the edited text item on each of the user terminals displaying the page having the text item thereon.

6. The method of claim 5 further comprising providing at least two of the users with simultaneous editing privileges.

7. The method of claim 1 wherein saving the edited text item comprises creating a new secondary file.

8. The method of claim 7 wherein the new secondary file includes at least one resource bundle, and the method further comprises creating the new secondary file for a translated version of the software application.

9. A system comprising:
a processor; and
a memory coupled with and readable by the processor and storing a set of instructions which, when executed by the processor, cause the processor to edit textual displays of a web-based software application having multiple web pages and multiple text items by:
executing the web-based software application, the software application including a set of executable instructions for displaying web pages on a graphical user interface and allowing interaction therewith by a user, the software application including at least one secondary file providing resource bundles having a single key and text strings corresponding to text items, the executable instructions having an identifier for locating the single key and for calling the text strings for display on the web page;
reading code for each text item which may be edited;
receiving a selection of a text item to be edited through a web page on which the text item is displayed;
creating an edited text item based on edits to the text item on the web page;
saving the edited text item to the secondary file, wherein the single key of the secondary file identifies text items that are displayed a plurality of times on the web page; and
dynamically displaying the edited text item in place of the text item on the web page using the single key for a plurality of users across a distributed network without reloading or refreshing the web page by the users.

10. The method of claim 9 further comprising overwriting the text strings in the resource bundle with the edited text item.

11. The system of claim 9 further comprising providing user privileges to a user to permit the user to edit the text items.

12. The system of claim 9 further comprising:
providing multiple locations on the web pages for a single text item;
providing a single identifier for the single text item in multiple locations; and
dynamically displaying edited text item in each of the multiple locations displayed.

13. The system of claim 9 further comprising:
hosting the software application on a host machine;
allowing simultaneous access to a plurality of users on a plurality of user terminals; and
dynamically changing the displayed text item to the edited text item on each of the user terminals displaying the page having the text item thereon.

14. The system of claim 13 further comprising providing at least two of the users with simultaneous editing privileges.

15. The system of claim 9 wherein saving the edited text item comprises creating a new secondary file.

16. The system of claim 15 wherein the new secondary file includes at least one resource bundle, and the method further comprises creating the new secondary file for a translated version of the software application.

17. A computer-readable memory storing a set of instructions which, when executed by a processor, cause the processor to edit textual displays of a web-based software application having multiple web pages and multiple text items by:
executing the web-based software application, the software application including a set of executable instructions for displaying web pages on a graphical user interface and allowing interaction therewith by a user, the software application including at least one secondary file providing resource bundles having a single key and text strings corresponding to text items, the executable instructions having an identifier for locating the single key and for calling the text strings for display on the web page;
reading code for each text item which may be edited;
receiving a selection of a text item to be edited through a web page on which the text item is displayed;
creating an edited text item based on edits to the text item on the web page;
saving the edited text item to the secondary file, wherein the single key of the secondary file identifies text items that are displayed a plurality of times on the web page; and
dynamically displaying the edited text item in place of the text item on the web page using the single key for a plurality of users across a distributed network without reloading or refreshing the web page by the users.

18. The computer-readable memory of claim 17 further comprising overwriting the text strings in the resource bundle with the edited text item.

19. The computer-readable memory of claim 17 further comprising providing user privileges to a user to permit the user to edit the text items.

20. The computer-readable memory of claim 17 further comprising:

providing multiple locations on the web pages for a single text item;
  providing a single identifier for the single text item in multiple locations; and
  dynamically displaying edited text item in each of the multiple locations displayed.

21. The computer-readable memory of claim 17 further comprising:
  hosting the software application on a host machine;
  allowing simultaneous access to a plurality of users on a plurality of user terminals; and
  dynamically changing the displayed text item to the edited text item on each of the user terminals displaying the page having the text item thereon.

22. The computer-readable memory of claim 21 further comprising providing at least two of the users with simultaneous editing privileges.

23. The computer-readable memory of claim 17 wherein saving the edited text item comprises creating a new secondary file.

24. The computer-readable memory of claim 23 wherein the new secondary file includes at least one resource bundle, and the method further comprises creating the new secondary file for a translated version of the software application.

* * * * *